(12) United States Patent
Shbeeb et al.

(10) Patent No.: US 9,476,611 B1
(45) Date of Patent: Oct. 25, 2016

(54) SOLAR ASSEMBLY FOR PRODUCTION OF ETHANOL, ELECTRICITY, POTABLE WATER, OR COMBINATIONS THEREOF

(71) Applicant: SB ENERGY, LLC, Houston, TX (US)

(72) Inventors: Sami N. Shbeeb, Houston, TX (US); Nayef F. Shbeeb, Houston, TX (US); Chaskey N. Barry, Houston, TX (US)

(73) Assignee: SB ENERGY, LLC, Houston, TX (US)

( * ) Notice: Subject to any disclaimer, the term of this patent is extended or adjusted under 35 U.S.C. 154(b) by 172 days.

(21) Appl. No.: 13/923,254

(22) Filed: Jun. 20, 2013

(51) Int. Cl.
| | | |
|---|---|---|
| F03G 6/06 | (2006.01) |
| F24J 2/00 | (2014.01) |
| F24J 2/07 | (2006.01) |
| F24J 2/10 | (2006.01) |
| F24J 2/38 | (2014.01) |
| B01D 3/00 | (2006.01) |
| F24J 2/12 | (2006.01) |
| F24J 2/14 | (2006.01) |

(52) U.S. Cl.
CPC .. *F24J 2/38* (2013.01); *B01D 3/00* (2013.01); *F03G 6/065* (2013.01); *F24J 2/07* (2013.01); *F24J 2/12* (2013.01); *F24J 2/14* (2013.01); *F03G 2006/061* (2013.01); *F03G 2006/062* (2013.01); *F24J 2002/0053* (2013.01); *F24J 2002/075* (2013.01); *F24J 2002/1023* (2013.01); *F24J 2002/1028* (2013.01); *F24J 2002/1071* (2013.01); *Y02E 10/45* (2013.01); *Y02E 10/46* (2013.01); *Y02E 10/47* (2013.01)

(58) Field of Classification Search
CPC ....... Y02E 10/47; Y02E 10/45; Y02E 10/46; F03G 2006/062; F03G 2006/061; F03G 6/065; F24J 2/07; F24J 2/12; F24J 2/14; F24J 2002/0053; F24J 2002/075; F24J 2002/1023; F24J 2002/1028; F24J 2002/1071
USPC .............. 126/600, 605, 634, 640, 692; 60/641.8–641.15
See application file for complete search history.

(56) References Cited

U.S. PATENT DOCUMENTS

| | | | | |
|---|---|---|---|---|
| 1,047,554 A | * | 12/1912 | Nichols .......................... | 126/607 |
| 4,203,426 A | * | 5/1980 | Matlock et al. .............. | 126/605 |
| 4,245,616 A | * | 1/1981 | Wyland .......................... | 126/579 |
| 4,561,423 A | * | 12/1985 | Blasey .......................... | 126/604 |
| 6,498,290 B1 | * | 12/2002 | Lawheed ...................... | 136/246 |

* cited by examiner

*Primary Examiner* — Nicholas J Weiss
*Assistant Examiner* — Wesley Harris
(74) *Attorney, Agent, or Firm* — Buskop Law Group, PC; Wendy Buskop (57) ABSTRACT

A modular and portable motorized solar concentrator assembly for production of ethanol, electricity, potable water, or combinations thereof can include a housing and a reflective array. An airtight chamber is formed in the reflective array, and ancillary reflective concentrators can provide addition solar radiation thereto. An inert gas in the airtight chamber can form a low-humidity and air-free environment. The portable motorized solar concentrator assembly can engage an electricity producing plant, a desalination plant, an ethanol producing plant, or combinations thereof.

23 Claims, 9 Drawing Sheets

SOLAR ASSEMBLY FOR PRODUCTION OF ETHANOL, ELECTRICITY, POTABLE WATER, OR COMBINATIONS THEREOF

FIELD

The present embodiments generally relate to a portable motorized solar concentrator assembly with inert gas chamber for creating greenhouse effect heating to distill organic fluids and non-potable water creating usable fuel and drinking water.

BACKGROUND

A need exists for a portable motorized and re-orientable solar concentrator assembly for concentrating solar radiation using multiple types of reflectors simultaneously for use in the production of fuel, such as ethanol, potable water from non-potable water, or combinations thereof using a distillation column.

A need exists for a portable motorized solar concentrator assembly that is usable to generate ethanol, electricity, potable water, or combinations thereof in earthquake zones, hurricane zones, other disaster areas, undeveloped geographic locations, remote villages, undeveloped population centers, or other remote locations. A need exists for a portable assembly that can be deployed quickly and oriented at the sun even if the assembly is deployed at different latitudes on the planet.

A need exists for a portable motorized solar concentrator assembly having a plurality of connected parabolic reflective enclosures for heating the fluids for distillation, as well as connected ancillary reflective concentrators configured to increase the heat to fluids in the parabolic reflective enclosures includes using conduits disposed at the focal points of the parabolic reflective enclosures.

A need exists for a portable motorized solar concentrator assembly that can be moveable with a motor, but the actual heating of the fluid is performed solely with the sun, allowing for the production of potable water from non-potable water in areas without power that have just had a major natural disaster, thereby helping to prevent disease and death in disaster zones.

A need exits for an easily relocatable, and re-orientable motorized solar concentrator assembly that utilizes the greenhouse effect to heat fluid.

The present embodiments meet these needs.

BRIEF DESCRIPTION OF THE FIGURES

The detailed description will be better understood in conjunction with the accompanying drawings as follows.

The present embodiments are detailed below with reference to the listed Figures.

DETAILED DESCRIPTION OF THE EMBODIMENTS

Before explaining the apparatus in detail, it is to be understood that the apparatus is not limited to the particular embodiments and that it are practiced or carried out in various ways.

The present embodiments relate to a portable motorized solar concentrator assembly for heating a fluid that can be distilled to produce drinking water or fuel.

In embodiments, the fluid to be heated can be salt water, contaminated fresh water, organic mash, oil, or another fluid, that when distilled can produce a usable condensate such as ethanol.

In embodiments, the portable motorized solar concentrator assembly can include a movable and adjustable housing.

In embodiments, the housing can be made of tubular metal; solid metal bars; square tubing; wood; alloys; aluminum; a non-corrosive metal; a rigid and non-deforming polymer capable of sustaining heat over 350 degrees Fahrenheit without deforming; a rigid and lightweight composite capable of sustaining heat over 350 degrees Fahrenheit without deforming, such as a graphic composite; or combinations thereof.

In one or more embodiments, the housing can include a fixed front support with a fixed front support top end.

In embodiments, the housing can include an adjustable rear support with a rear support top end that can adjust a reflective array attached to the housing.

The housing adjustable rear support, in embodiments, can be raised or lowered with a cranking mechanism or screw mechanism or a pin lock system to a desired height allowing the portable motorized solar concentrator assembly to be at an optimal angle of inclination to the sun given the location of reflective array on the planet.

The first side of the housing can connect between the fixed front support and the adjustable rear support at a first and second corner.

A second side of the housing can connect between the fixed front support and the adjustable rear support at a third and fourth corner.

The side members can be rods, bars, perforated members, or combinations thereof.

An adjustable foot can be mounted at each corner. Each adjustable foot can be used to elevate or lower a portion of the housing.

In embodiments, a coating can encapsulate the housing to provide cathodic protection thereto, such as in the presence of seawater.

A reflective array can be mounted to the housing.

The reflective array can have a plurality of sequentially connected individual parabolic reflective enclosures. Each individual parabolic reflective enclosure orients towards a focal point.

The reflective array, in embodiments, can be modular and configured to have two or more of the parabolic reflective enclosures connected together.

In one or more embodiments, the reflective array can be positioned using the motor and moving the frame to orient the reflective array such that an angle of incidence to the sun solar radiation is reflected using the parabolic reflective enclosures to a plurality of focal points, forming a line, in each individual parabolic reflective enclosure. Rigid conduits can be positioned along the line of focal points. The rigid conduits flow the non-potable water or organic fluid for heating, and then for further distillation.

In one or more embodiments, up to 30 parabolic reflective enclosures can be attached to the housing.

The reflective array can be mounted to the fixed front support top end and to the adjustable rear support top end simultaneously.

Each parabolic reflective enclosure can have a parabolic rigid non-deforming substrate. Each rigid non-deforming substrate can have a concave side.

Each rigid non-deforming substrate is capable of maintaining the concave side while withstanding temperatures from 350 degrees Fahrenheit to 500 degrees Fahrenheit.

Each rigid non-deforming substrate can have a top end and a bottom end, a first edge between the top end and the bottom end and a second edge between the top end and the bottom end opposite the top end.

In embodiments, the first and second edges can be twice as long as the top and bottom ends.

For each non-deforming substrate concave side, the angle of incidence of the solar radiation to each concave side is defined by the equation $y=x^2/(4*F)$, wherein F is a distance from a center point of each concave side to the focal point of that concave side, and wherein x and y define a point on that concave side.

A continuous reflective film having a thickness from about 1 mil to about 0.1345 inches can be placed onto the concave side. The continuous reflective film can be adhered to the concave side of the parabolic rigid non-deforming substrate.

The reflective film can be used to reflect solar radiation to a focal point on the concave side forming a line of focal points along a longitudinal axis of the concave side, thereby forming a parabolic reflective enclosure with a series of longitudinal focal points, connected adjacent each other.

Each parabolic reflective enclosure can be mounted in parallel to an adjacent parabolic reflective enclosure.

A first edge of a first parabolic reflective enclosure can be connected to a second edge of an adjacent parabolic reflective enclosure.

The continuous reflective film can be adhered with a sprayable polyurethane glue capable of withstanding high heat, over 250 degrees Centigrade, for holding the film onto the concave side of the parabolic rigid non-deforming substrate. The film is for reflecting solar radiation to a focal point forming the parabolic reflective enclosure.

In embodiments, the parabolic reflective enclosures can be mounted in parallel. Each first edge of a parabolic reflective enclosure can be connected to a second edge of an adjacent parabolic reflective enclosure.

In an embodiment, the parabolic reflective enclosures can be reflective laminates.

Pluralities of ancillary reflective concentrators can be connected on opposite ends of the parabolic reflective enclosures for reflecting additional solar radiation into the parabolic reflective enclosures. The parabolic reflective enclosures can reflect the additional solar radiation to the focal points.

In an embodiment, a first ancillary reflective concentrator can be made from a planar substrate onto which is adhered a reflective film identical to the reflective film used on the concave side.

The substrate of the first ancillary reflective concentrator is fixedly connected to the fixed front support.

In this embodiment, a second ancillary reflective concentrator can be made from a planar substrate onto which is adhered a reflective film identical to the film used on the first ancillary reflective concentrator.

The second ancillary reflective concentrator can be fixedly connected to the adjustable rear support.

The ancillary reflective enclosures can reflect the additional solar radiation to the focal points of the parabolic reflective enclosure.

The high temperature resistant substrates can be aluminum, or another metal or a graphite composite.

The portable motorized solar concentrator assembly can include rigid conduits, which are single or multiple conduit rigid pipes.

The rigid conduits can be supported on reflector rotation assemblies attached with the housing. The non-potable fluid or organic liquid that is for distillation can flow through the rigid conduits to be heated at the focal points. The rigid conduits can be made of copper, stainless steel, or any other material.

The rigid conduits can be positioned at the focal points along the longitudinal length of each parabolic reflective enclosure.

Each rigid conduit can extend longitudinally from the top end to the bottom end of one of the parabolic reflective enclosures through the focal point of that parabolic reflective enclosure.

Each rigid conduit can act as a pivot point for rotating each parabolic reflective enclosure.

Each rigid conduit can have a non-reflective coating disposed thereon, such as a black pigment, for absorbing heat from the sunlight.

Each reflector rotation assembly can attach to the housing and be positioned such that centers of the rigid conduits are at the focal points of the reflective array.

In embodiments, each parabolic reflective enclosure can have a substrate, made of a metal, such as aluminum or graphite composite, which is shaped into a parabola. The reflective film can be a self-adhesive reflective film, disposed on the concave side of the substrate.

In one or more embodiments, the substrate can be made of a polymer sheet that does not deform at temperatures from 140 degrees Fahrenheit to 500 degrees Fahrenheit. The substrate can be an aluminum sheet; a thin non-corrosive, non-deforming metal sheet which holds its shape in high temperatures. The substrate can be a metal alloy, such as brass, or another material.

In embodiments, the parabolic reflective enclosures can have resistance to tearing and resistance to brittleness at temperatures as low as −30 degrees Fahrenheit and as high as 500 degrees Fahrenheit.

In embodiments, each parabolic reflective enclosure can have a width that ranges from about 2 feet to about 8 feet and a length that ranges from about 4 feet to about 12 feet.

In one or more embodiments, the reflective film can be formed from a sheet having a gauge ranging from about 10 to about 50.

In operation, the parabolic reflective enclosures can provide up to 99 percent reflection of solar radiation towards the focal point.

Flexible conduits can connect between the rigid conduits, allowing the rigid conduits to rotate within the parabolic reflective enclosures. The flexible conduits can be woven or braided pipe with single or multiple conduits disposed therein.

Non-corrosive and non-dissolving beads, such as glass beads, in an embodiment, can be disposed in the rigid conduits to enhance heating of the fluid therein. The non-corrosive and non-dissolving beads can preheat in the rigid conduits using heat from the parabolic reflective enclosures.

In embodiments, the non-corrosive and non-dissolving beads can be ceramic beads, metal beads, or polymer beads.

In an embodiment, a first of the flexible conduits can be connected at one end for receiving non-potable water or organic fluid and at another end with each of the rigid conduits.

A second flexible conduit can provide an outlet for the heated fluid.

The non-potable fluid or organic fluid, such as mash, can flow from the fluid source through a flexible conduit to and through the rigid conduits then back to the flexible conduits to a distillation column for separating fuel from the heated organic fluid or drinking water from the heated non-potable water.

In embodiments, the fluid can be heated and transferred to a desalination plant for desalination of non-potable water, an electricity producing plant for production of electricity, an ethanol producing plant for production of alcohol, or combinations thereof.

A plurality of reflector rotation assemblies can be attached to the housing and to one of the rigid conduits for rotating the housing to align the array with the sun.

A multivariable speed bidirectional motor can be connected to a screw drive that engages the housing for moving the parabolic reflective enclosures as the reflector rotation assemblies align the housing with the sun.

A controller can be connected to the multivariable speed bidirectional motor to perform solar tracking using astronomical information.

A transparent rigid cover can be installed over each parabolic reflective enclosure forming an airtight chamber. The transparent rigid cover can be held to the housing with fasteners.

The transparent rigid cover, in embodiments, can be glass; a rigid membrane; a clear ceramic; a clear and rigid high-temperature resistant polymer, wherein high-temperature is over 250 degrees Fahrenheit but less than 1000 degrees Fahrenheit; a clear composite; another transparent or translucent material; or combinations thereof.

An inert gas, such as argon, nitrogen, or combinations thereof, can be introduced into the airtight chamber; thereby removing air therefrom and lowering the humidity within the airtight chamber.

In one or more embodiments, a sealing material, such as a urethane gasket or O-ring, can be used to seal the airtight chamber. In embodiments, a flexible silicone, non-rigid sealant can be used to seal the transparent rigid cover to the housing; thereby allowing movement thereof during transport without breaking the seal and releasing the inert gas in the airtight chamber.

The parabolic reflective enclosures can be controlled by a controller, using a track. The controller can include a computer with a data storage and computer instructions. The computer instructions can cause the motor to move the portable motorized solar concentrator assembly to track inclination and declination of the sun to provide for substantially continuous solar radiation concentration at the focal points of the parabolic reflective enclosures, while simultaneously trapping heat in the airtight chamber causing the fluid to receive additional heat via a thermal effect.

Figure 1A:
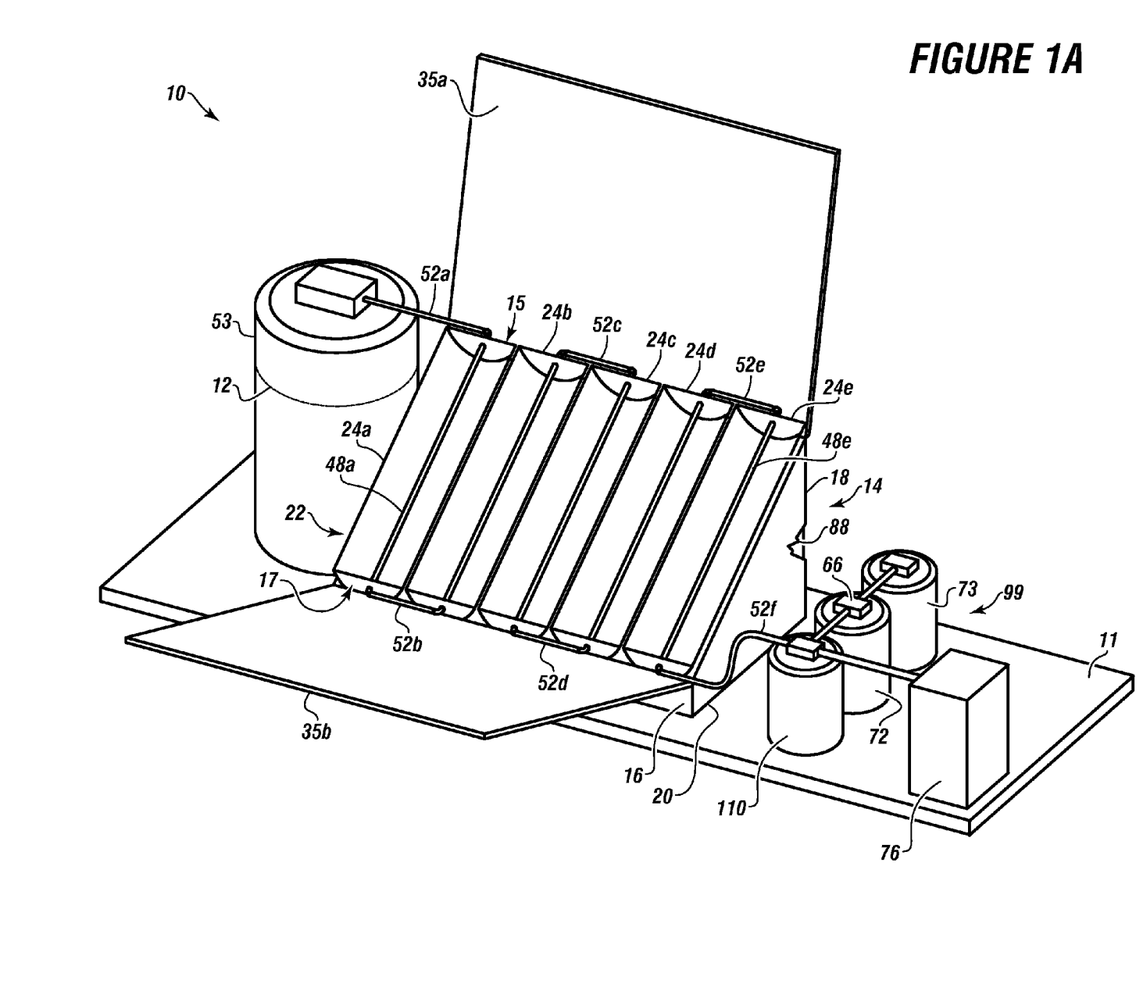
FIG. 1A depicts an embodiment of the portable motorized solar concentrator assembly for producing potable water, electricity, or combinations thereof.

Turning now to the Figures, FIG. 1A depicts an embodiment of the portable motorized solar concentrator assembly for producing potable water, electricity, or combinations thereof.

The portable motorized solar concentrator assembly 10, which can be modular and portable, can operate to heat a fluid 12 for distillation. The fluid can be an organic fluid or non-potable water or oil, or combinations thereof.

The portable motorized solar concentrator assembly 10 can include a housing 14 mounted on a skid 11, a base 20, a fixed front support 16, and an adjustable rear support 18.

The housing can have a first side and a second side.

In one or more embodiments, the housing 14 can be made of tubular metal, solid metal bars, square tubing, wood, aluminum, non-corrosive metal, a polymer capable of sustaining heat over 140 degrees Fahrenheit without deforming, or lightweight composite.

In one or more embodiments, a coating 88 can be disposed over the housing 14 to provide cathodic protection thereto.

The portable motorized solar concentrator assembly 10 can include a reflective array 22. The reflective array 22 can include a plurality of sequentially connected parabolic reflective enclosures, such as parabolic reflective enclosures 24a, 24b, 24c, 24d, and 24e. The parabolic reflective enclosures 24a-24e can be attached to the housing 14.

The reflective array 22 can be modular and configured to have two or more of the parabolic reflective enclosures 24a-24e connected together. For example, the reflective array 22 can have, in embodiments, from about two to about thirty parabolic reflective enclosures attached to the housing 14.

The reflective array 22 can have a top end 15 and a bottom end 17.

One or more ancillary reflective concentrators 35a and 35b can be connected to the housing 14. For example, a first ancillary reflective concentrator 35a can be connected to the housing 14 proximate the top end 15 and a second ancillary reflective concentrator 35b can be connected to the housing 14 proximate the bottom end 17. The ancillary reflective concentrators 35a and 35b can be connected to the housing 14 via hinges or a fixed connection.

The ancillary reflective concentrators 35a and 35b can reflect additional solar radiation to the parabolic reflective enclosures 24a-24e, and each parabolic reflective enclosure 24a-24e can reflect the additional solar radiation to its corresponding focal point.

The portable motorized solar concentrator assembly 10 can include a plurality of rigid conduits, such as rigid conduits 48a and 48e. Each rigid conduit can extend from the top end 15 to the bottom end 17 within one of the parabolic reflective enclosures 24a-24e, and can be disposed overlapping the focal points of each of the parabolic reflective enclosures 24a-24e.

The portable motorized solar concentrator assembly 10 can include a plurality of flexible conduits 52a, 52b, 52c, 52d, 52e, and 52f.

A first flexible conduit 52a can be connected at one end with a fluid source 53 for providing the fluid 12. The first flexible conduit 52a can be connected at another end with the rigid conduit 48a.

Each of the flexible conduits 52b-52e can be connected between two adjacent rigid conduits.

The final flexible conduit 52f can be connected at one end with the rigid conduit 48e and can provide an outlet of the fluid 12 from the portable motorized solar concentrator assembly 10. As such, the fluid 12 can flow from the fluid source 53 and through the rigid conduits and flexible conduits.

In operation, as the fluid 12 flows through the portable motorized solar concentrator assembly 10, the solar radiation provided by the portable motorized solar concentrator assembly 10 can heat the fluid 12.

In one or more embodiments, the fluid 12 can be non-potable water, such as seawater, and the portable motorized solar concentrator assembly 10 can heat the non-potable water to produce heated non-potable water. The portable motorized solar concentrator assembly 10 can transfer the heated non-potable water to a distillation column or a desalination plant with distillation column 99 to create potable water from the heated non-potable water.

The distillation column 99 can include an evaporation tank 72 that receives heated non-potable water from the portable motorized solar concentrator assembly 10, and a condensation tank 73.

The outlet of the fluid 12 can flow the fluid 12 to the evaporation tank 72. Vaporized portions of the fluid 12 can flow from the evaporation tank 72 into the condensation tank 73.

As such, the distillation column 99 can create vapor, and the condensation tank 73 can receive the vapor. The condensation tank 73 can be in fluid communication with the evaporation tank 72, allowing the vapor to condense as potable water.

The distillation column 99 can include a temperature sensitive restrictor valve 66 that opens when the heated non-potable water exceeds a boiling point.

In one or more embodiments, the heated non-potable water can flow to an expansion tank 110 to operate a steam turbine or steam piston system 76 before flowing to the distillation column 99; thereby allowing for the production of electricity in addition to potable water.

One or more additional portable motorized solar concentrator assemblies can be in communication with the expansion tank 110 for heating oil to provide to a coil in the expansion tank 110 for additional heat.

The portable motorized solar concentrator assembly 10 can also operate to make potable water without producing electricity.

Figure 1B:
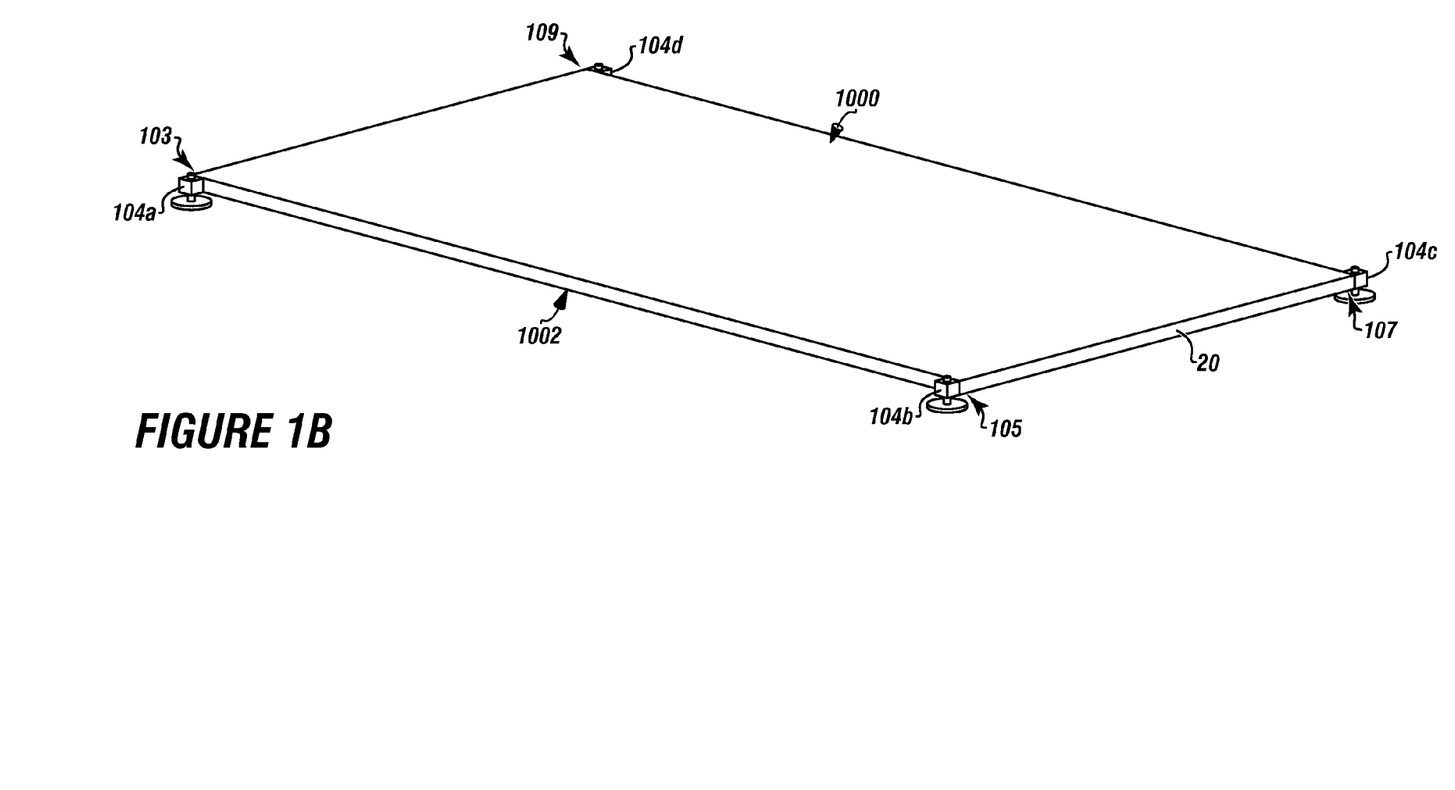
FIG. 1B depicts an embodiment of the base of the portable motorized solar concentrator assembly.

FIG. 1B depicts the base 20. The base can include adjustable feet 104a, 104b, 104c and 104d. Each foot can connect at a corner 103, 105, 107 and 109 of the housing. The first side 1000 and second side 1002 are also depicted.

Figure 2A:
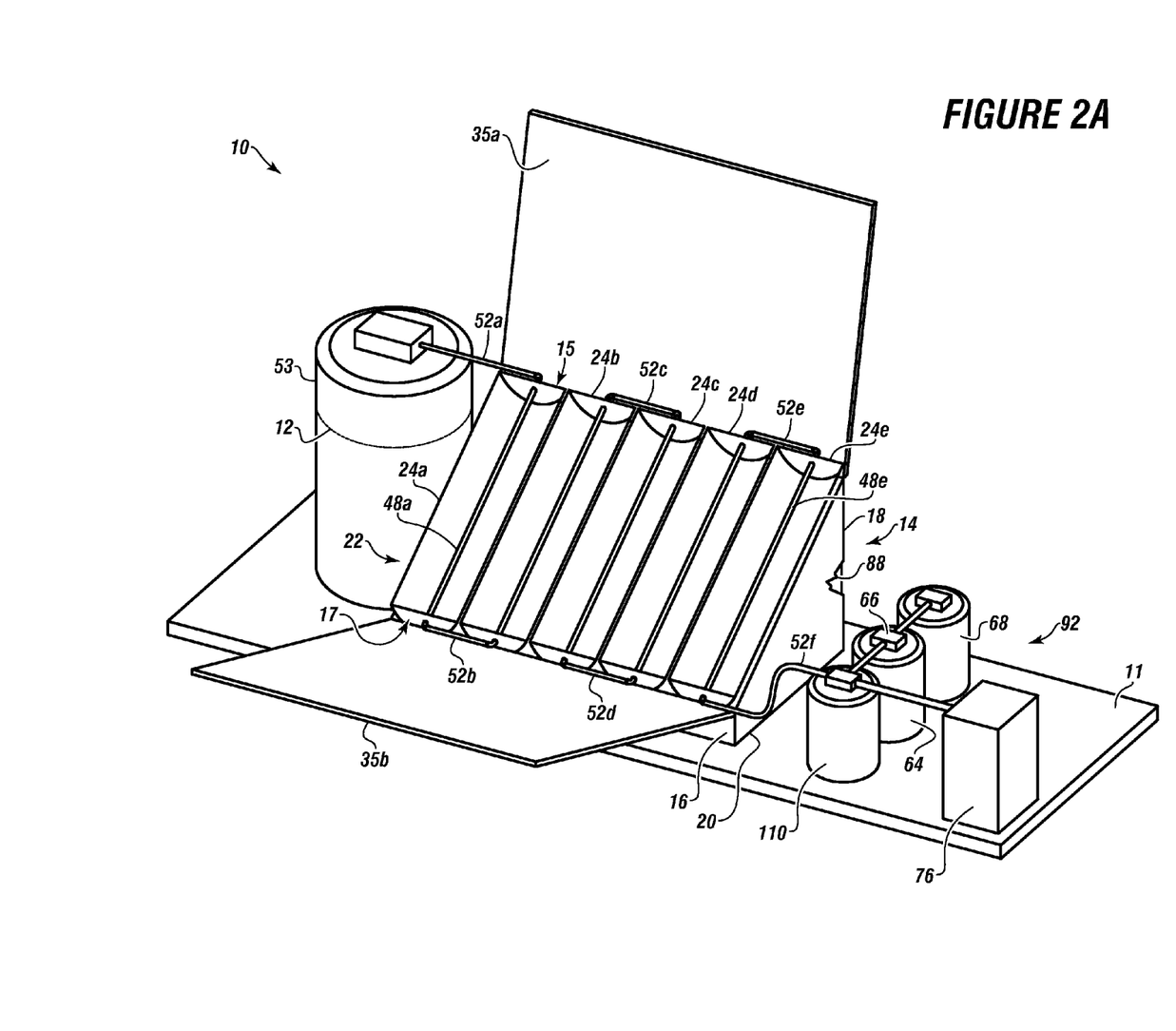
FIG. 2A depicts an embodiment of the portable motorized solar concentrator assembly for producing ethanol, electricity, or combinations thereof.

FIG. 2A depicts an embodiment of the portable motorized solar concentrator assembly for producing ethanol, electricity, or combinations thereof.

The portable motorized solar concentrator assembly 10 of FIG. 2A is substantially similar to that of FIG. 1A, with like numerals designating like parts.

The fluid 12, in embodiments, can be a liquefied organic fluid having ethanol and water. The portable motorized solar concentrator assembly 10 can heat the liquefied organic fluid to a boil.

The liquefied organic fluid, in embodiments, can be a mash, such as mashed corn stalks, mashed sugar cane, or another fluidized cellulose product.

The outlet of the portable motorized solar concentrator assembly 10 can flow the heated fluid to a distillation column 64 for an ethanol production plant 92. The distillation column 64 can be any device capable of distillation known in the art.

The distillation column 64 of the ethanol plant can have a width-to-height ratio of 1-to-24. The distillation column 64 can be configured to produce 95 percent alcohol by volume using the heated liquefied organic fluid.

The ethanol production plant 92 can include a temperature sensitive restrictor valve 66 that opens when the heated liquefied organic fluid exceeds a boiling point.

The ethanol production plant 92 can include a condenser 68 for receiving ethanol vapor from the distillation column 64 and forming a condensate therefrom.

As such, the distillation column 64 can separate ethanol and water.

In one or more embodiments, the liquefied organic fluid can flow to an expansion tank 110 to operate a steam turbine or steam piston system 76 before flowing to the distillation column 64 for production of electricity.

One or more additional portable motorized solar concentrator assemblies can be in communication with the expansion tank 110 for heating oil to provide to a coil in the expansion tank 110 for additional heat.

The portable motorized solar concentrator assembly 10 can also operate to make 95 percent alcohol by volume without producing electricity.

Figure 2B:
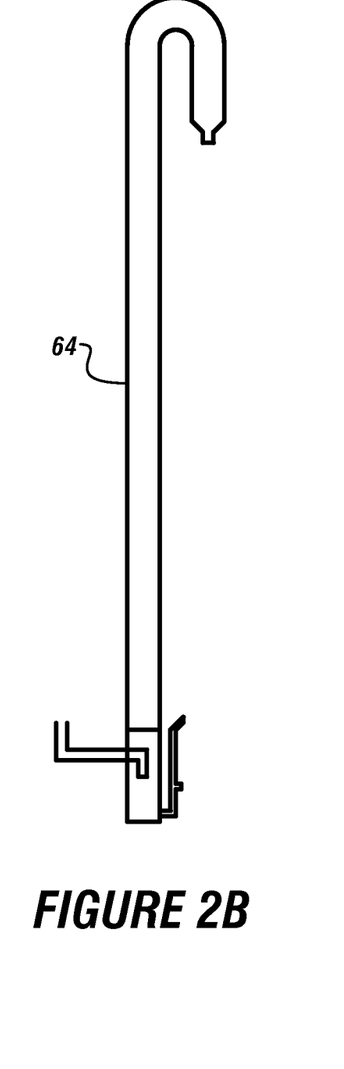
FIG. 2B depicts a detail view of a distillation column according to one or more embodiments.

FIG. 2B depicts a detail view of an embodiment of a distillation column for an ethanol plant according to one or more embodiments.

The distillation column 64 can be used to separate ethanol and water.

Figure 3:
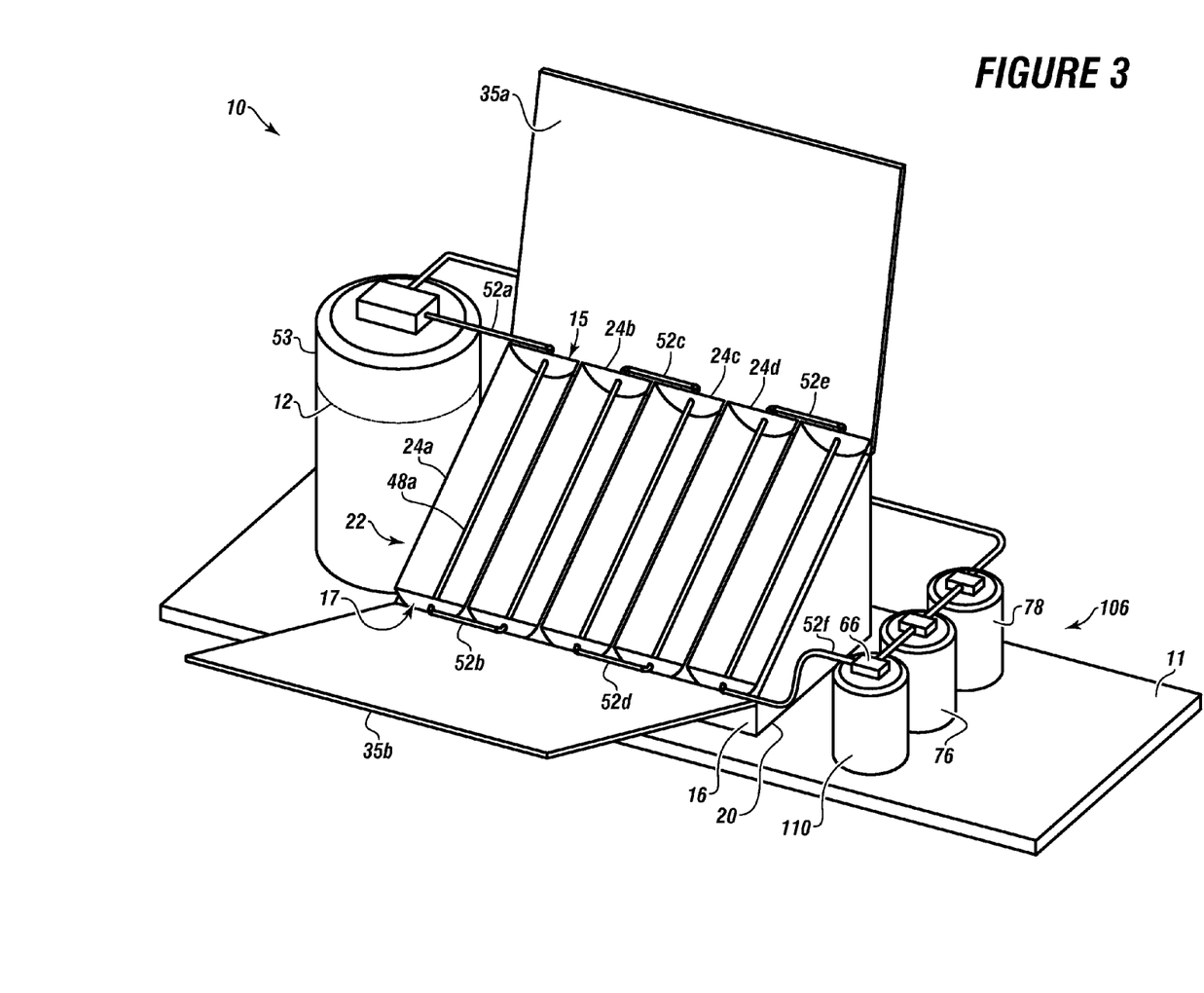
FIG. 3 depicts an embodiment of portable motorized solar concentrator assembly for producing electricity.

FIG. 3 depicts an embodiment of portable motorized solar concentrator assembly for producing electricity.

The portable motorized solar concentrator assembly 10 of FIG. 3 is substantially similar to those shown in FIGS. 1A and 2A, with like numerals designating like parts.

In one or more embodiments the fluid 12 can be water and the portable motorized solar concentrator assembly 10 can form steam by heating the fluid 12.

The fluid 12 can include steam and water, which can flow through the outlet to an expansion tank 110 to operate a steam turbine or steam piston system 76.

The steam turbine or steam piston system 76 can be at an electricity producing plant 106.

In operation, the steam can flow through a temperature sensitive restrictor valve 66 that limits a rate of flow of the steam to the steam turbine or steam piston system 76.

The electricity producing plant 106 can also include a collector 78 in fluid communication with the steam turbine or steam piston system 76. The collector 78 can collect condensate from the steam turbine or steam piston system 76 for recycling back to the portable motorized solar concentrator assembly 10a, such as into the fluid source 53.

One or more additional portable motorized solar concentrator assemblies can be in communication with the expansion tank 110 for heating oil to provide to a coil in the expansion tank 110 for additional heat.

Figure 4:
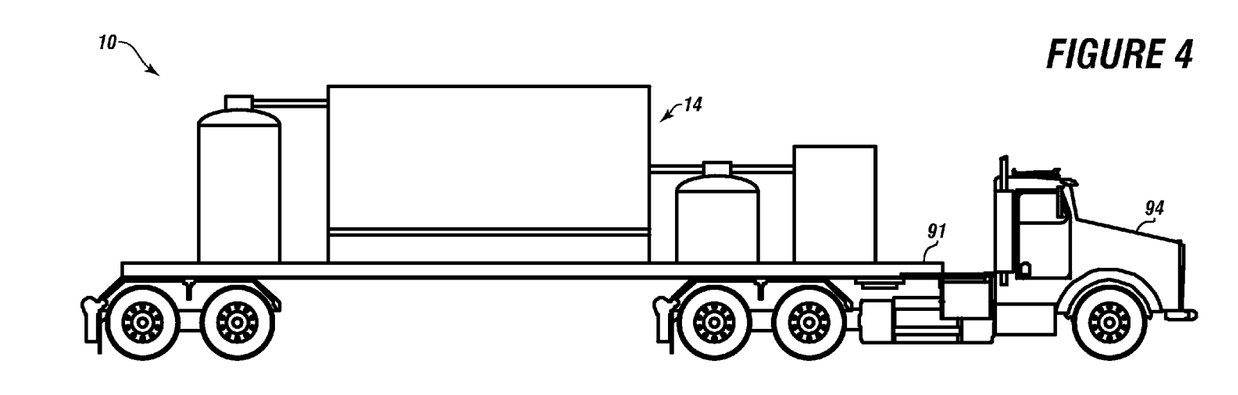
FIG. 4 depicts an embodiment of the portable motorized solar concentrator assembly mounted on a truck and trailer.

FIG. 4 depicts an embodiment of the portable motorized solar concentrator assembly mounted on a truck and trailer.

The portable motorized solar concentrator assembly 10 can be mounted on a transport vehicle, such as a truck 94 and a trailer 91.

The trailer 91 can be integrated with the housing 14; thereby enabling quick relocation of the portable motorized solar concentrator assembly 10 from one site to another site without requiring disassembly of the portable motorized solar concentrator assembly 10.

Figure 5:
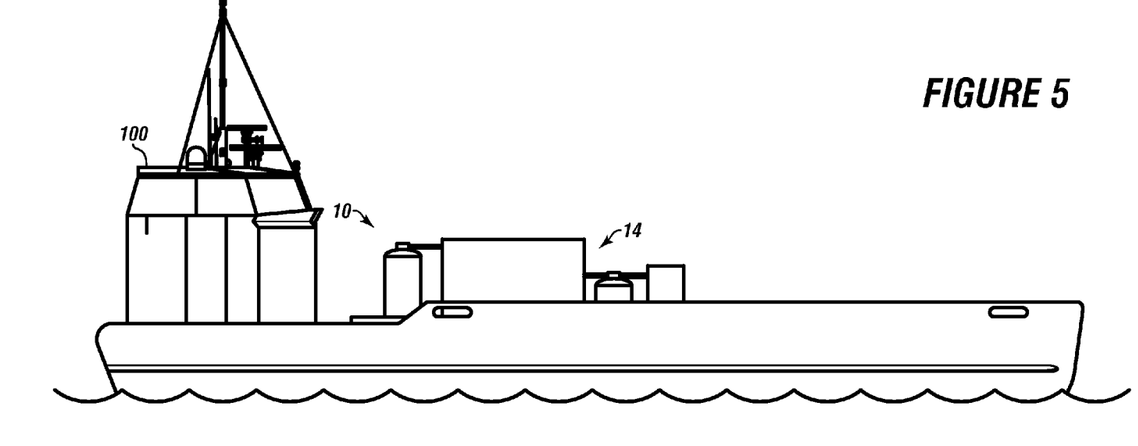
FIG. 5 depicts an embodiment of the portable motorized solar concentrator assembly mounted on a barge.

FIG. 5 depicts an embodiment of the portable motorized solar concentrator assembly mounted on a barge.

The portable motorized solar concentrator assembly 10 can be mounted on a transport vehicle, such as a barge 100.

The barge 100 can be integrated with the housing 14; thereby enabling quick relocation of the portable motorized solar concentrator assembly 10 from one site to another site without requiring disassembly of the portable motorized solar concentrator assembly 10.

Figures 6A, 6B:
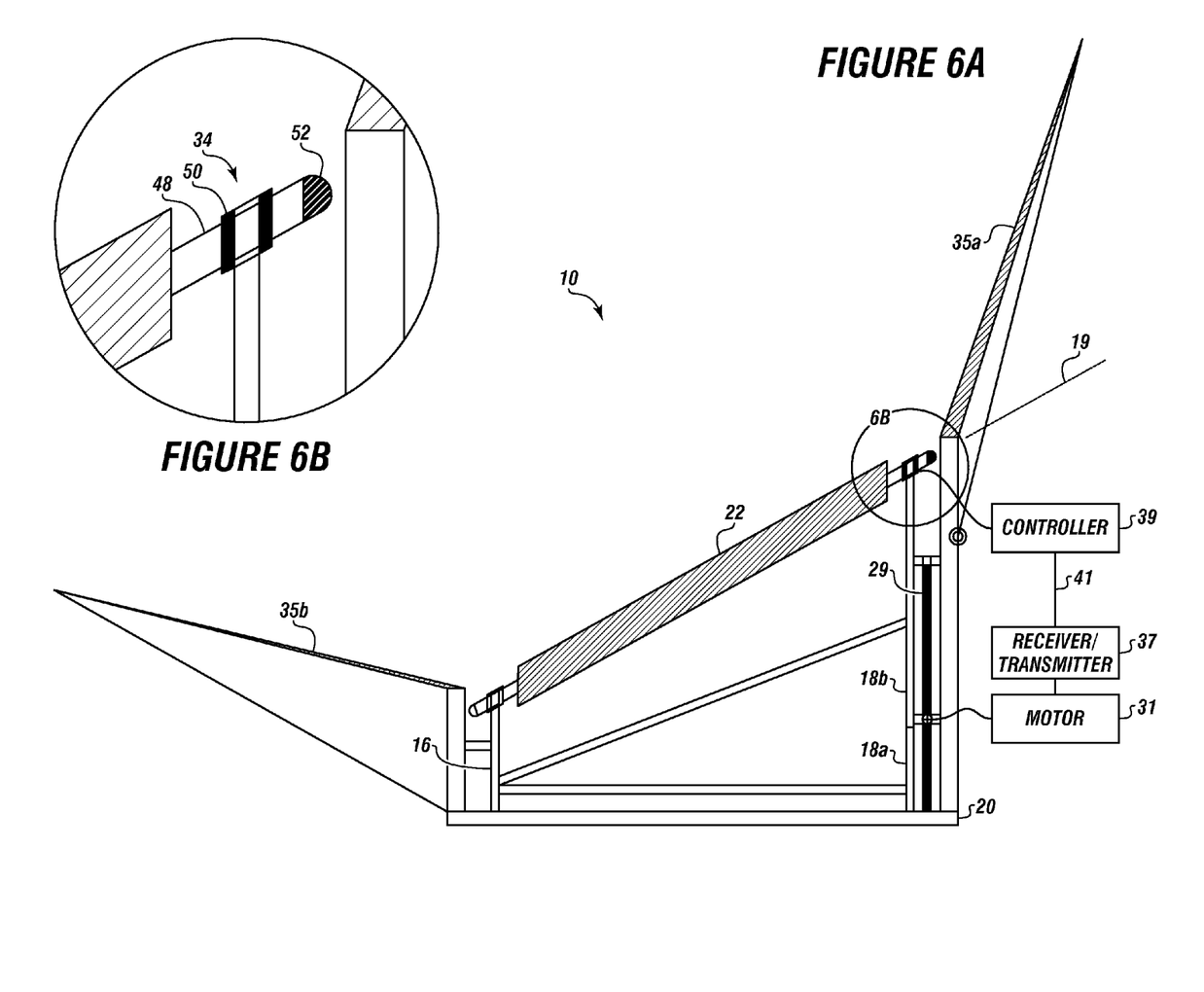
FIGS. 6A and 6B depict detailed side views of the portable motorized solar concentrator assembly.

FIGS. 6A and 6B depict detailed side views of the portable motorized solar concentrator assembly.

The adjustable rear support 18a and 18b can be slidably connected to the base 20 forming a plane 19 between the fixed front support 16 and the adjustable rear support 18a and 18b. The reflective array 22 can be disposed along the plane 19.

The adjustable rear support 18a and 18b can be moveable to adjust the plane 19 to different angles of inclination ranging from an elevation parallel to a natural horizon to an elevation that is sixty percent higher than a height of the fixed front support 16.

In one or more embodiments, the portable motorized solar concentrator assembly 10 can include a crank or screw mechanism 29 for applying load to the adjustable rear support 18a and 18b to change the angle of inclination between the adjustable rear support 18a and 18b and the fixed front support 16; thereby changing the angle of the plane 19.

In one or more embodiments, the crank or screw mechanism 29 can attach to a wire cable connected with the adjustable rear support 18a and 18b. The crank or screw mechanism 29 can apply load to the adjustable rear support 18a and 18b to change the angle of inclination of the plane 19. The crank or screw mechanism 29 can be manually operable or operated by a machine.

In one or more embodiments, the first half of the adjustable rear support 18a can be attached to the base 20 and the second half of the adjustable rear support 18b can be moved to adjust the angle of inclination of the plane 19.

In one or more embodiments, a multivariable speed bidirectional motor 31 which can be an AD or 12 volt DC motor, can be in communication with the crank or screw mechanism 29 and with a receiver/transmitter 37.

The receiver/transmitter 37 can be in communication with a controller 39 via a network 41 for receiving commands to automatically change the angle of inclination of the reflective array angling the array up or down between the adjustable rear support 18a and 18b and the fixed front support 16.

In one or more embodiments, the controller 39 can be in communication with one or more reflector rotation assemblies 34 to control tracking of the parabolic reflective enclosures in the reflective array 22 and automatically change the angle of inclination using solar tracking and astronomical information.

The reflector rotation assemblies 34 can each be attached to the housing and to one of the rigid conduits 48 adjacent the flexible conduits 52.

In one or more embodiments, the housing can be made of tubular reinforced aluminum, and the fixed front support 16 can include one or more tubulars mounted to the base 20 at a 90 degree angle. The adjustable rear support 18a and 18b can include one or more telescoping tubulars with a locking means; thereby allowing the telescoping tubulars to extend and retract to change the angle of inclination of the plane 19.

Sleeves 50 can be disposed between each rigid conduit 48 and one of the reflector rotation assemblies 34 for preventing longitudinal movement of the rigid conduits 48. The sleeves 50 can be made of a metal or a polymer that prevents movement of the rigid conduits 48.

The ancillary reflective concentrators 35a and 35b can be adjusted to reflect solar radiation to the reflective array 22.

Figure 7:
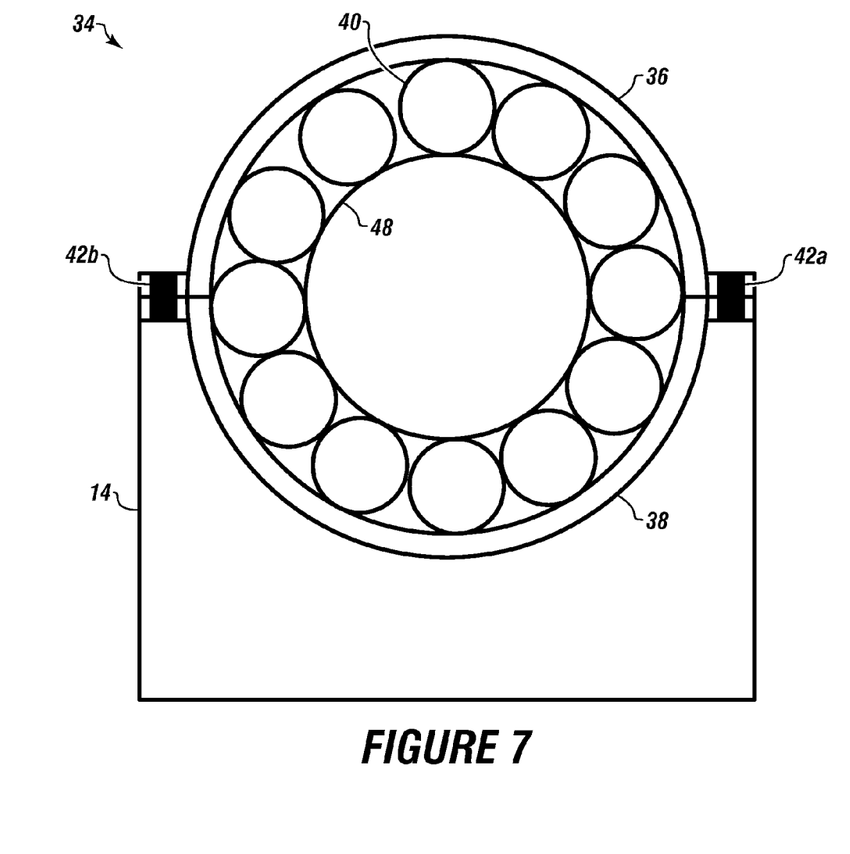
FIG. 7 depicts a detail view of the reflector rotation assemblies.

FIG. 7 depicts a detail view of the reflector rotation assemblies.

The reflector rotation assemblies 34 can each be attached to the housing 14 and to one of the rigid conduits 48.

The reflector rotation assemblies 34 can have a top housing portion 36 connected with a bottom housing portion 38 forming a holder.

A plurality of rollers 40 can be contained within the holder. In one or more embodiments, the rollers 40 can be ball bearings, rolling cylinders, egg shaped objects, or combinations thereof.

A means for fastening 42a and 42b, such as bolts, can fasten the top housing portion 36 to the bottom housing portion 38.

In one or more embodiments, the top housing portion 36 can be hinged to the bottom housing portion 38 to allow the top housing portion 36 to be opened from the bottom housing portion 38.

In operation, the reflector rotation assemblies 34 can allow the parabolic reflective enclosure to rotate laterally to track inclination and declination of the sun for providing substantially continuous solar radiation concentration at the focal points while trapping heat in the airtight chamber via a thermal effect, such as the greenhouse effect.

Figure 8:
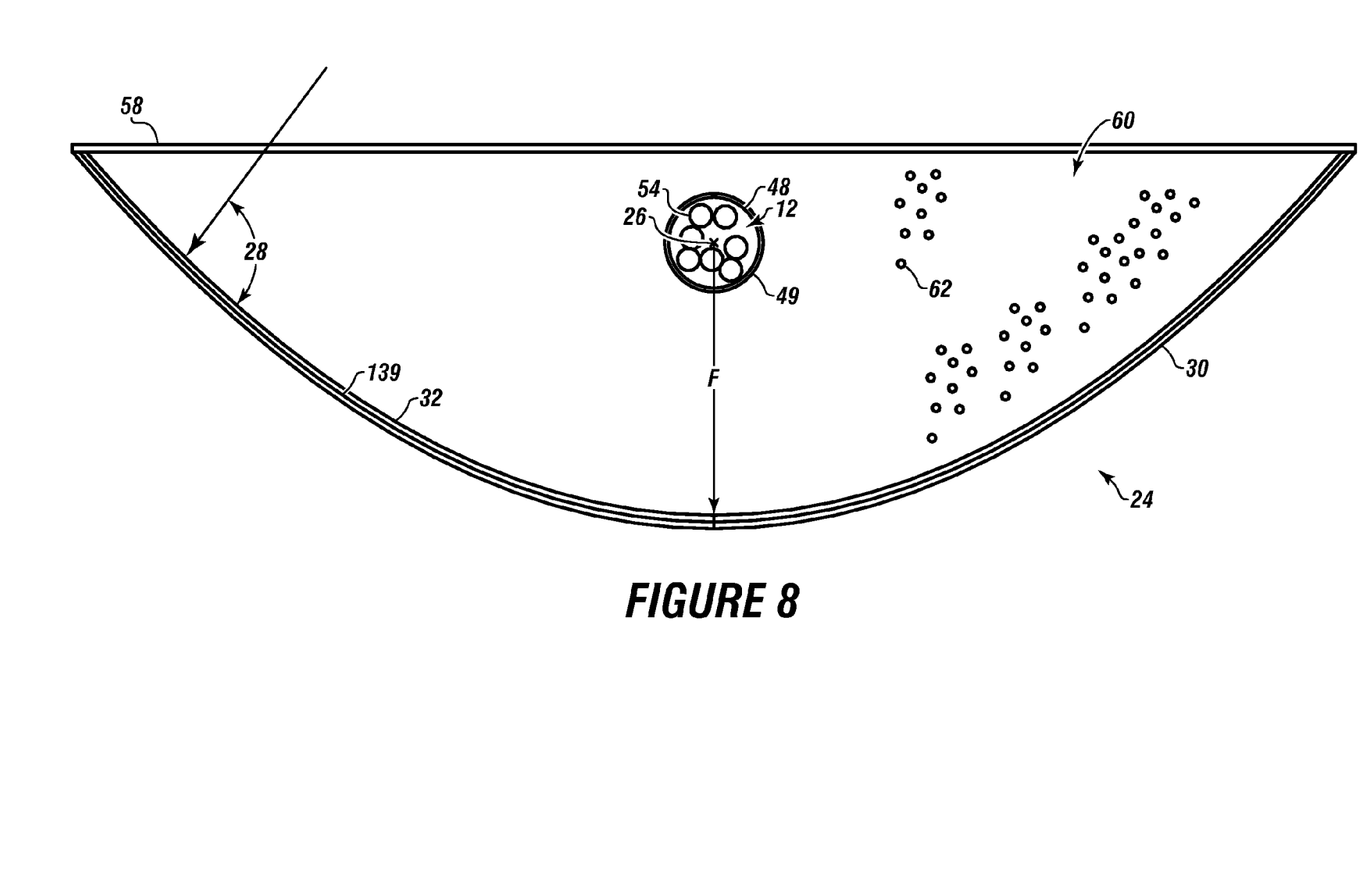
FIG. 8 depicts a detail cut view of a parabolic reflective enclosure.

FIG. 8 depicts a detail cut view a parabolic reflective enclosure.

The parabolic reflective enclosure 24 can include a parabolic rigid non-deforming substrate 30 and a reflective film 32. The reflective film 32 can be secured to a concave side 139 of the parabolic rigid non-deforming substrate 30 for reflecting solar radiation to a focal point 26.

In one or more embodiments, the parabolic rigid non-deforming substrate 30 can include a polymer sheet that does not deform at temperatures up to 500 degrees Fahrenheit, and can be an aluminum sheet, or a thin non-corrosive and non-deforming metal sheet.

In one or more embodiments, the parabolic reflective enclosure 24 can be laminate, acrylic mirrors, or tempered glass mirrors. For example, the continuous reflective film 32 can be a reflective sheet or a film laminated over the parabolic rigid non-deforming substrate 30.

In one or more embodiments, the continuous reflective film 32 can be resistant to tearing and can have a resistance to brittleness at temperatures as low as −30 degrees Fahrenheit and as high as 500 degrees Fahrenheit. The film can be adhered to the substrate with a spray glue.

An angle of incidence 28 of the solar radiation onto the parabolic reflective enclosure 24 can be defined by $y=x^2/(4*F)$, where F is a distance from a center point of the parabolic reflective enclosure 24 to the focal point 26, and x and y define a point on that parabolic reflective enclosure 24 on the concave side.

The rigid conduits 48 can be disposed in each parabolic reflective enclosure, such that the focal point 26 is the rigid conduit 48.

In one or more embodiments, a non-reflective coating 49 can be disposed on the rigid conduit 48, such as magnetite mixed with high-temperature paint, which can be black or brown.

A plurality of non-corrosive and non-dissolving beads 54 can be disposed within the rigid conduit 48 in an embodiment. The non-corrosive and non-dissolving beads 54 can operate to displace the fluid 12 within the rigid conduit 48, can retain heat, or combinations thereof.

In one or more embodiments, the non-corrosive and non-dissolving beads 54 can be glass beads, ceramic beads, stainless steel beads, beads made of another heat transferring metal, or combinations thereof.

A transparent rigid cover 58 can be disposed over the parabolic reflective enclosure 24. The transparent rigid cover 58 can be made of glass, a rigid membrane, a clear ceramic, a clear and rigid high-temperature resistant polymer, a clear composite, a non-reflective material, or combinations thereof.

An airtight chamber 60 can be formed between the transparent rigid cover 58 and the parabolic reflective enclosure 24.

The airtight chamber 60, when evacuated of air, can receive an inert gas 62, such as nitrogen, which can be contained within the airtight chamber 60; thereby forming a low-humidity and air-free environment.

The parabolic reflective enclosure 24 can track the inclination and declination of the sun to receive substantially continuous solar radiation for concentration at the focal points of each parabolic reflective enclosure, which form a line of focal points, trapping heat in the airtight chamber 60 via the greenhouse effect.

While these embodiments have been described with emphasis on the embodiments, it should be understood that within the scope of the appended claims, the embodiments might be practiced other than as specifically described herein.

What is claimed is:

1. A portable motorized solar concentrator assembly for heating to distill organic fluids and non-potable water creating usable fuel and drinking water, wherein the portable motorized solar concentrator assembly comprising:
    a. a housing comprising:
        (i) a fixed front support that has a fixed front support top end;
        (ii) an adjustable rear support has a rear support top end that adjusts a reflective array to a desired height by raising or lowering the adjustable rear support with a raising or lowering mechanism;
        (iii) a first side connecting between the fixed front support and the adjustable rear support at a first corner and a second corner;
        (iv) a second side connecting between the fixed front support and the adjustable rear support at a third corner and a fourth corner; and
        (v) a base connected to a bottom portion of the fixed front support and the adjustable rear support, wherein the base comprises a plurality of adjustable feet mounted thereto for independently elevating or lowering a portion of the housing;
    b. an adjustable foot for moving the adjustable rear support of the housing along a longitudinal axis of each foot that supports the adjustable rear support;
    c. the reflective array mounted to the fixed front support top end and to the adjustable rear support top end; wherein the reflector array comprises a plurality of parabolic reflective enclosures, which when connected form a top end and a bottom end, each parabolic reflective enclosure comprises:
        (i) a parabolic rigid non-deforming substrate having a concave side capable of withstanding temperatures from 350 degrees Fahrenheit to 500 degrees Fahrenheit, and having a top end and a bottom end opposite the top end, a first edge between the top end and the bottom end and a second edge between the top end and the bottom end;
        (ii) a continuous reflective film adhered to the concave side of the parabolic rigid non-deforming substrate for reflecting solar radiation to a focal point forming the parabolic reflective enclosure; and
        (iii) wherein the parabolic reflective enclosures are mounted in parallel; and
        wherein an angle of incidence of the solar radiation to each concave side is defined by the equation $y=x^2/(4*F)$, wherein F is a distance from a center point of each concave side to the focal point of that concave side, and wherein x and y define a point on that concave side;
    d. a first ancillary reflective concentrator comprising a reflective film on a high temperature resistant substrate is fixedly connected to the fixed front support and a second ancillary reflective concentrator comprising a reflective film on a high temperature resistant substrate is fixedly connected to the adjustable rear support; and wherein the parabolic reflective enclosures reflect the additional solar radiation to the corresponding focal points;
    e. a plurality of rigid conduits in fluid communication with a fluid source comprising a fluid, wherein each rigid conduit extends longitudinally from the top end to the bottom end of one of the parabolic reflective enclosures through the focal points of that parabolic reflective enclosure, and each rigid conduit acts as a pivot point for rotating each parabolic reflective enclosure wherein each rigid conduit has a non-reflective coating disposed thereon for receiving heat from the sunlight and thereby heating fluid contained in the rigid conduits;
    f. a plurality of flexible conduits in fluid communication with the fluid source, each of the rigid conduits, and an outlet in fluid communication with a distillation column or a desalination plant, wherein fluid flows from the fluid source to the outlet through the flexible conduits and the rigid conduits creating a heated fluid, in order to convey heated fluid to the distillation column for separating fuel from an organic fluid or the desalination plant for separating drinking water from non-potable water;
    g. a plurality of reflector rotation assemblies, wherein each reflector rotation assembly is attached to the housing and to one of the rigid conduits for allowing each parabolic reflective enclosure to rotate and align with the sun;
    h. a multivariable speed bidirectional motor engaging the housing for moving the parabolic reflective enclosures as the reflector rotation assemblies align the housing with the sun;
    i. a controller connected to the multivariable speed bidirectional motor to perform solar tracking using astronomical information;
    j. a plurality of transparent rigid covers, wherein each transparent rigid cover is disposed over at least one parabolic reflective enclosure;
    k. airtight chambers formed between the transparent rigid covers and the parabolic reflective enclosures; and
    l. an inert gas contained within the airtight chambers forming a low-humidity and air-free environment, wherein the reflector rotation assemblies allow the parabolic reflective enclosures to rotate laterally to track inclination and declination of the sun for providing substantially continuous solar radiation concentration at the focal points while trapping heat in the airtight chambers via a thermal effect.

2. The portable motorized solar concentrator assembly of claim 1, further comprising a plurality of non-corrosive and non-dissolving beads disposed in each rigid conduit, wherein the non-corrosive and non-dissolving beads displace the fluid within the rigid conduits, retain heat, or combinations thereof.

3. The portable motorized solar concentrator assembly of claim 2, wherein the non-corrosive and non-dissolving beads are glass beads, ceramic beads, stainless steel beads, beads made of another heat transferring metal, or combinations thereof.

4. The portable motorized solar concentrator assembly of claim 1, wherein the ancillary reflective concentrators comprise:
   a. a first ancillary reflective concentrator connected to the housing proximate the top ends of the parabolic reflective enclosures; and
   b. a second ancillary reflective concentrator connected to the housing proximate the bottom ends of the parabolic reflective enclosures.

5. The portable motorized solar concentrator assembly of claim 1, wherein the housing comprises tubular metal, solid metal bars, square tubing, wood, aluminum, non-corrosive metal, a polymer capable of sustaining heat over 250 degrees Fahrenheit without deforming, or lightweight composite.

6. The portable motorized solar concentrator assembly of claim 1, further comprising a coating disposed over the housing to provide cathodic protection thereto.

7. The portable motorized solar concentrator assembly of claim 1, wherein the controller is configured to control tracking of the parabolic reflective enclosures.

8. The portable motorized solar concentrator assembly of claim 1, wherein the reflective array comprises from two to thirty parabolic reflective enclosures attached to the housing.

9. The portable motorized solar concentrator assembly of claim 1, wherein the parabolic rigid non-deforming substrate comprises: a polymer sheet that does not deform at temperatures up to 140 degrees Fahrenheit, an aluminum sheet, or a thin non-corrosive and non-deforming metal sheet.

10. The portable motorized solar concentrator assembly of claim 1, wherein the parabolic reflective enclosures are laminates, acrylic mirrors, or tempered glass mirrors.

11. The portable motorized solar concentrator assembly of claim 1, wherein the reflective film is resistant to tearing and has a resistance to brittleness at temperatures as low as −30 degrees Fahrenheit and as high as 500 degrees Fahrenheit.

12. The portable motorized solar concentrator assembly of claim 1, wherein each reflector rotation assembly comprises:
   a. a top housing portion connected with a bottom housing portion forming a holder;
   b. a plurality of rollers contained within the holder; and
   c. a means for fastening the top housing portion to the bottom housing portion.

13. The portable motorized solar concentrator assembly of claim 12, wherein the rollers are ball bearings, rolling cylinders, egg shaped objects, or combinations thereof.

14. The portable motorized solar concentrator assembly of claim 1, further comprising sleeves, wherein each sleeve is disposed between one of the rigid conduits and one of the reflector rotation assemblies for preventing longitudinal movement of the rigid conduits.

15. The portable motorized solar concentrator assembly of claim 1, wherein each transparent rigid cover comprises glass, a rigid membrane, a clear ceramic, a clear and rigid high-temperature resistant polymer, a clear composite, a non-reflective material, or combinations thereof.

16. The portable motorized solar concentrator assembly of claim 1, wherein the fluid is a liquefied organic fluid, and wherein the portable motorized solar concentrator assembly heats the liquefied organic fluid to a boil.

17. The portable motorized solar concentrator assembly of claim 16, wherein the portable motorized solar concentrator assembly is in fluid communication with an expansion tank, and further wherein the expansion tank is in fluid communication with a steam turbine or a steam piston system operated by the liquefied organic fluid flowing before flowing to the distillation column for production of electricity.

18. The portable motorized solar concentrator assembly of claim 16, further comprising an ethanol production plant, wherein the distillation column forms a portion of the ethanol production plant, wherein the distillation column has a width-to-height ratio of 1-to-24, wherein the distillation column is configured to produce 95 percent alcohol by volume using the heated liquefied organic fluid, and wherein the ethanol production plant further comprises:
   a. a temperature sensitive restrictor valve that opens when the heated liquefied organic fluid exceeds a boiling point; and
   b. a condenser for receiving ethanol vapor and forming a condensate therefrom.

19. The portable motorized solar concentrator assembly of claim 1, wherein the fluid is non-potable water, and wherein the portable motorized solar concentrator assembly heats the non-potable water to produce heated non-potable water and transfers the heated non-potable water to a desalination plant to create potable water, and further wherein the desalination plant comprises:
   a. an evaporation tank that receives heated non-potable water from the portable motorized solar concentrator assembly;
   b. a temperature sensitive restrictor valve that opens when the heated non-potable water exceeds a boiling point, wherein the desalination plant creates vapor; and
   c. a condensation tank that receives the vapor, wherein the condensation tank is in fluid communication with the evaporation tank, allowing the vapor to condense as the potable water.

20. The portable motorized solar concentrator assembly of claim 19, wherein the portable motorized solar concentrator assembly is in fluid communication with an expansion tank, and further wherein the expansion tank is in fluid communication with a steam turbine or a steam piston system operated by the heated non-potable water for production of electricity before flowing to the desalination plant.

21. The portable motorized solar concentrator assembly of claim 1, wherein the fluid is water and the portable motorized solar concentrator assembly creates pressurized steam from the water and transfers the pressurized steam through the outlet to an expansion tank to operate a steam turbine or steam piston system.

22. The portable motorized solar concentrator assembly of claim 21, further comprising an electricity producing plant, wherein the steam turbine or steam piston system forms a portion of the electricity producing plant, wherein the pressurized steam flows through a temperature sensitive restrictor valve that limits a rate of flow of the pressurized steam to the steam turbine or steam piston system, wherein the electricity producing plant further comprises a collector in fluid communication with the steam turbine or steam piston system, and wherein the collector collects condensate from the steam turbine or steam piston system for recycling back to the portable motorized solar concentrator assembly.

23. The portable motorized solar concentrator assembly of claim 1, wherein the portable motorized solar concentrator assembly is mounted on a transport vehicle, wherein the transport vehicle is a truck, a barge, a trailer, or combinations thereof, and wherein the transport vehicle is integrated with the housing, thereby enabling for quick relocation of the portable motorized solar concentrator assembly from one site to another site without requiring disassembly of the portable motorized solar concentrator assembly.

* * * * *